(12) United States Patent
Kromer et al.

(10) Patent No.: US 6,370,450 B1
(45) Date of Patent: Apr. 9, 2002

(54) INTEGRATED TOTAL TEMPERATURE PROBE SYSTEM

(75) Inventors: Dana A. Kromer, Minnetonka; John A. Severson, Eagan, both of MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 09/459,130

(22) Filed: Dec. 10, 1999

(51) Int. Cl.$^7$ ............................................. G06F 17/00
(52) U.S. Cl. ..................... 701/14; 702/144; 374/135; 340/945; 244/134 D; 73/861.68
(58) Field of Search .................. 701/1, 4, 14; 702/127, 702/130, 142, 144; 374/100, 135, 138; 340/945, 540, 603; 219/201, 490, 492; 244/134 R, 134 D, 134 F; 73/861.65, 861.68

(56) References Cited

U.S. PATENT DOCUMENTS

| | | | |
|---|---|---|---|
| 2,970,475 A | | 2/1961 | Werner |
| 4,458,137 A | * | 7/1984 | Kirkpatrick ................. 219/201 |
| 4,947,165 A | * | 8/1990 | Zweifel ....................... 340/968 |
| 5,080,496 A | | 1/1992 | Keim et al. |
| 6,070,475 A | * | 6/2000 | Muehlhauser et al. ... 73/861.68 |
| 6,076,963 A | * | 6/2000 | Menzies et al. ............ 374/138 |

FOREIGN PATENT DOCUMENTS

| | | |
|---|---|---|
| EP | 629 845 | 12/1994 |
| WO | WO 95/00825 | 1/1995 |
| WO | WO 95/08122 | 3/1995 |

OTHER PUBLICATIONS

Journal: IEEE Aerospace and Electronic Systems Magazine, Apr. 1994, V9, N4; pp. 7–14.

* cited by examiner

Primary Examiner—William A. Cuchlinski, Jr.
Assistant Examiner—Edward Pipala
(74) Attorney, Agent, or Firm—Nickolas E. Westman; Westman, Champlin & Kelly

(57) ABSTRACT

A smart probe system for an aircraft receives an input from a heated total air temperature sensor. When on the ground, the heater for the total air temperature probe is cycled so that when a preselected temperature is indicated by the temperature sensing element in the total air temperature probe, the heater power is turned off, and as the total air temperature probe cools, changes. Changes in indicated temperature from the temperature sensing element are measured and the changes analyzed and used for determining outside air temperature. The outside air temperature can be calculated by determining the rate of change in the temperature while the probe cools. A complimentary method is to determine when the indicated temperature stabilizes, after the heater is turned off, and deriving outside air temperature from the stabilized temperature signal from the sensing element.

18 Claims, 5 Drawing Sheets

INTEGRATED TOTAL TEMPERATURE PROBE SYSTEM

CROSS REFERENCE TO RELATED APPLICATION

Reference is made to copending application Ser. No. 09/405,853, filed Sept. 24, 1999 entitled Integrated Smart Probe System, and owned by the same assignee as the present application.

BACKGROUND OF THE INVENTION

The present invention relates to a system utilizing a temperature signal from a total air temperature probe for determining outside or ambient air temperature, and controlling the total air temperature (TAT) probe heaters to avoid excess heating, which reduces product life. The determining of the outside air temperature is preferably carried out with tile processor of a "smart" air data sensing probe.

At the present time, total air temperature (TAT) probes or sensors are used for providing temperature inputs when the aircraft is in flight. The TAT probes, which extend into the airflow, are heated for anti-icing purposes. When the aircraft is on the ground, where there is little or no airflow, the heaters will raise the temperature of the TAT probe so directly obtaining a valid temperature signal from a temperature sensing element in the probe is not possible. When the aircraft is in flight, this is not an issue, because of the cooling effect of the airflow past the probe and sensing-element.

At the present time, outside air temperature of an aircraft on the ground is determined with a separate sensor or through manual means, such as direct voice communication with an air controller, and is used for engine settings, and other inputs prior to take off. With the need for reducing overall weight of !an aircraft, not requiring a separate outside air temperature sensor is important. When the need for manual input is eliminated pilot workload is reduced, which is desirable. Further, reducing the maximum temperature of the total air temperature probe will increase the life of the probe.

SUMMARY OF THE INVENTION

The present invention in one aspect relates to operation of a total air temperature (TAT) probe. One aspect of the invention is to use a processor on the aircraft to receive total air temperature inputs from a temperature sensing element, estimate the outside air temperature and control the maximum temperature that the TAT probe reaches when on the ground, by cycling the heater on the total temperature probe mounting the sensing element on and off, and sensing changes in the indicated temperature when the heater is turned off.

The cooling rate of the probe is determined by how quickly the temperature indication or signal from the total air temperature sensing element decays or decreases when the heater used for deicing the TAT probe is turned off. This rate of change of temperature is sensed by the sensing element in the probe, and since it is a function of the outside air temperature, it may be used to provide an accurate outside air temperature indication.

A second method for determining the outside air temperature is to heat the probe to a selected temperature, shut off the heater and sample the output signal of the temperature sensing element in the probe until the indicated temperature stabilizes, that is, until the temperature signal does not change more than a selected value during a selected time period. The outside air temperature thus is no longer causing significant cooling of the probe and the signal provided indicates the actual outside air temperature.

Predicting the outside temperature based on cooling rate is faster, but is also influenced by environmental factors, such as wind. Both methods are used together for readings of increased accuracy.

These derived indications of outside air temperature can then be used for various inputs, including engine settings and the like. Also, the heaters for the TAT probe can be turned on periodically to insure that the probe remains ice free at all times.

Another aspect of the invention is to control the heaters for the TAT probes using the processor on a smart angle of attack and pressure sensor probe (a smart probe), rather than using separate on-board computers.

DETAILED DESCRIPTION OF THE ILLUSTRATIVE EMBODIMENTS

Figure 1:
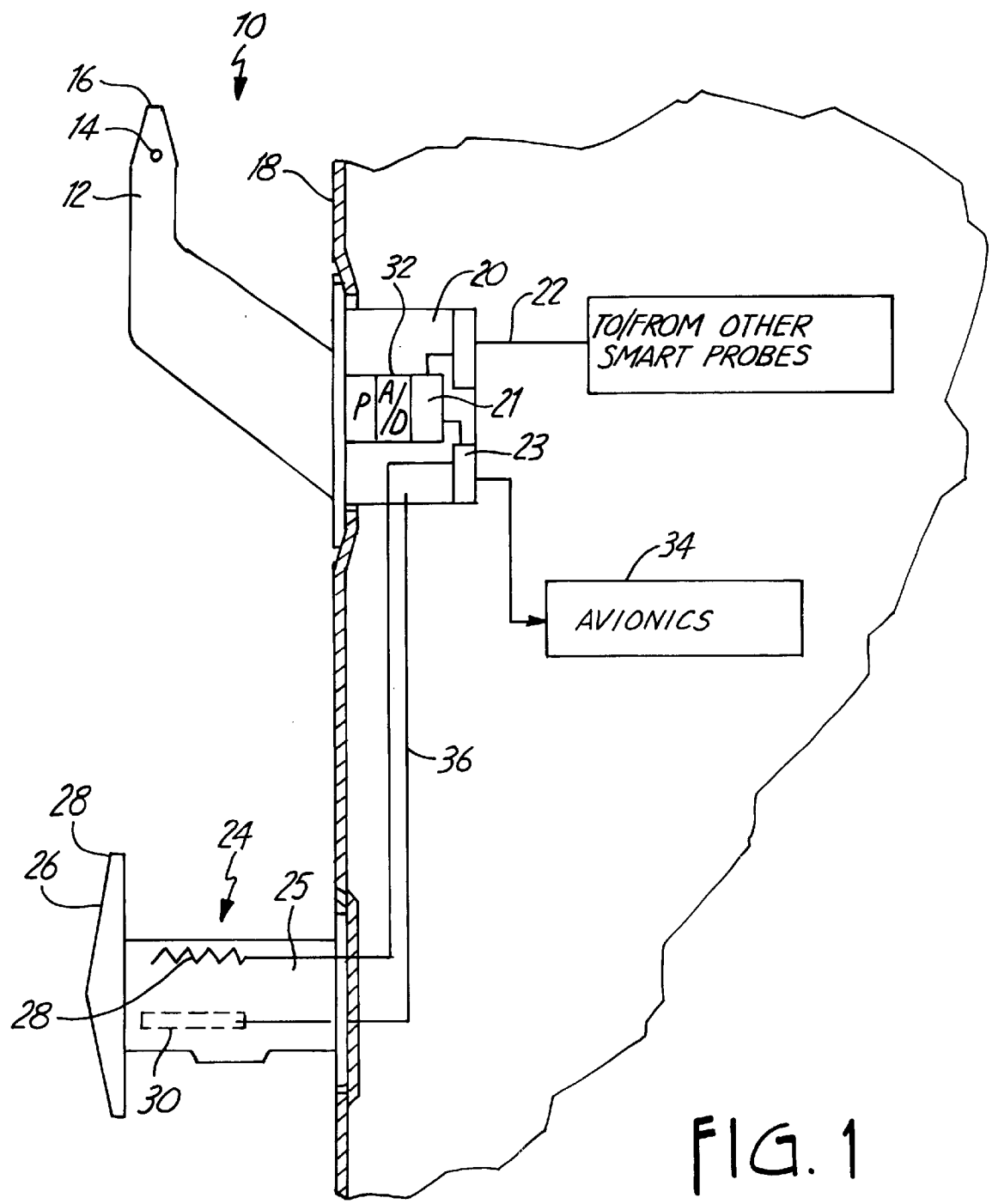
FIG. 1 is a schematic representation of a typical smart probe system including total temperature sensor inputs.

A smart air data probe indicated generally at 10 includes strut 11 and a probe barrel section 12 that has air data sensing ports 14 for sensing angle of attack and also has a pitot port at the end indicated at 16 for sensing pitot pressure. The probe 10 is mounted onto the skin 18 of an aircraft, and includes processor circuitry 20 that is a programmable processor including memory 21. Internal pressure sensors "p" and analog to digital (A/D) converters 32 in the probe processor circuits 20, 21 are used for converting analog pressure signals from sensors P into digital pressure signals, and then the processor 20 provides such signals along data transmission lines 22 to other smart probes on an aircraft, to avionics systems 34, or to crew displays. The probe 10 is thus a smart probe.

In the present invention, a total air temperature (TAT). probe 24 of conventional design is also mounted on the aircraft skin 18 in an appropriate position, and in flight provides a total air temperature signal from a temperature sensitive element 30 in the probe. The temperature signals are in turn used for compensating various inputs to the avionics. The use of total air temperature signals is well known for aircraft operation.

The TAT probe 24 includes a tubular barrel or body 26 through which air will flow. The barrel 26 is designed for boundary layer control and is mounted on a strut 25 to the skin 18 of the aircraft. In order to maintain the barrel 26 and the strut 25 forming the probe free of ice, one or more heaters represented schematically at 28 may be installed in or on the barrel 26 and strut 25 and are operated to maintain the barrel and strut above freezing temperature during use. The temperature sensitive element 30 is mounted in the TAT probe to provide a signal indicating the temperature sensed at the probe. The temperature sensitive element 30 is mounted in a flow passageway of the strut, as shown.

When the aircraft is on the ground, the heater or heaters 28 are generally energized to insure that the TAT probe does not ice up and to insure that the heaters are "on" when the aircraft takes off. Problems do arise when the temperature of the barrel and strut of the TAT probe gets too high, because the metal parts will, over time, deteriorate and shorten the life of the TAT sensor. When the heaters are on and the aircraft is stationary or is moving less than a selected speed which causes a cooling airflow, a valid temperature signal is not directly available from the sensing element 30 in the TAT probe because of heater induced error.

The present invention includes providing the conventional total air temperature signal ($T_T$), which is a signal from sensing element 30 and is an analog signal, through an analog to digital converter 32 in the smart probe processor 20 along a line 36. The total air temperature signal from the sensing element 30 then can be used in calculations and for compensations of pressure signals, as is conventionally done for aircraft components or systems, such as in the avionics 34 for engine control. In addition, by the use of the present invention, the outside air temperature can be determined as a function of the temperature signal from the sensing element 30 when the aircraft is on the ground to provide engine settings while on the ground and before take off roll. An algorithm in the processor provides the calculation from the input signals used.

Figure 2:
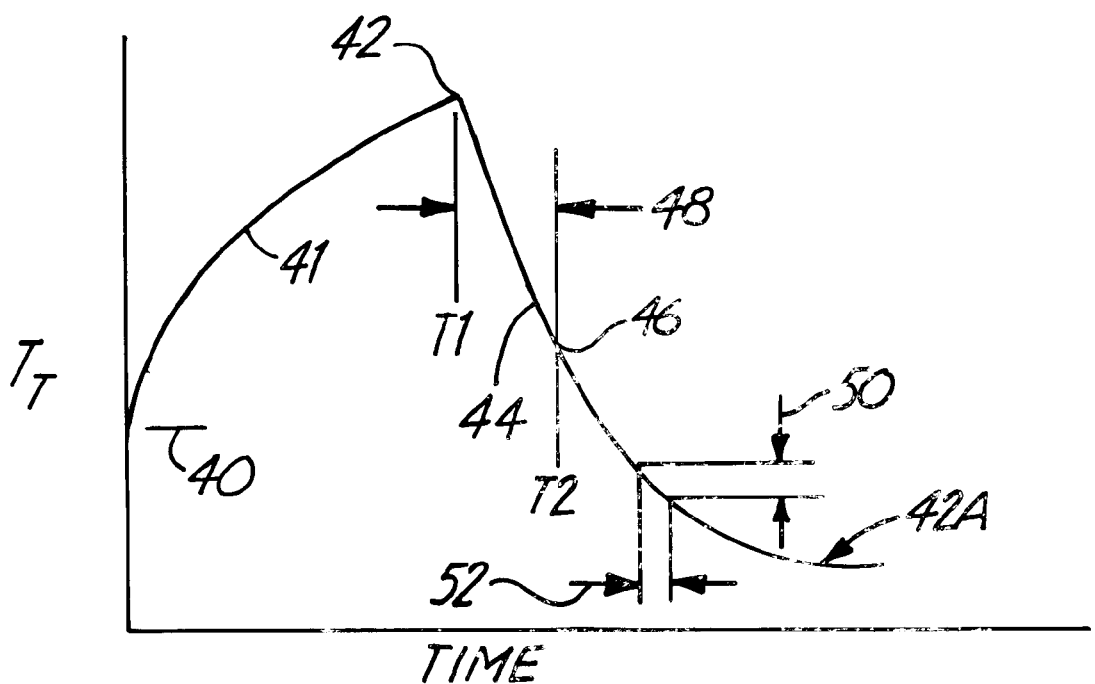
FIG. 2 is a graphical representation of a the sensed temperature signal from the total temperature sensor relative to time, as controlled in accordance with the present invention.

FIG. 2 illustrates a typical plot of temperature rise for a heated total air temperature probe plotted with controlled heat when the aircraft is on the ground. The total air temperature signal $T_T$ from sensing element 30 will be at a certain level, indicated at 40 in FIG. 2, when the heater is first energized. As the heater 28 continues to heat the probe, the sensed temperature signal will rise with time, along the line 41 up to a selected temperature, such as that indicated at 42 and designated Ti. $T_1$ is selected to be higher than the maximum ambient temperature expected, but not so high as to shorten the life of the TAT probe. The processor 20 is programmed to then operate a control circuit 23 to turn off the heater or heaters 28. Cooling will take place with time, as represented by the line 44 in FIG. 2.

The processor can be programmed to determine the rate of temperature decay, that is, the drop from the T1 temperature to a particular point on the curve 44, such as the point T2, indicated at 46, that occurs in a time indicated at 48. The time required for the measured temperature to drop a set number of degrees from T1 to T2, or the slope of line 44, can be used to approximate the outside air temperature according to equation (1) below.

The rate of change of the sensed temperature signal is a function of the outside air temperature. If a convection heat transfer coefficient consistent with still or low velocity air is assumed, the rate change of temperature can be used for estimating outside air temperature. When the aircraft is stationary or moving slowly on the ground.

Outside air temperature may be estimated using the cooling rate of the TAT probe. The temperature T signal of the probe at a given time, t, is dependant on its initial temperature, the temperature of the air surrounding the probe and physical characteristics of the probe as shown by the following equation:

$$T_T = T(t) = \Delta T_0 e^{-ha/mc)t} + T\infty \quad (1)$$

where:
$T(t)$ is the temperature indicated by the probe at time "t"
t is time
$\Delta T_o$ is the initial temperature variation between the probe and the outside air ($T_1 - T\infty$)
h is the convection heat transfer coefficient for the probe in outside air
$T\infty$ is the outside air temperature
A is the surface area of the probe
m is the mass of the probe
c is the specific heat of the probe This equation represents the curve of FIG. 2 beginning at time T1. Solving for $T\infty$ results in a predictive estimate of the final value of the probe temperature at time t. This equation represents established theory supporting the idea of using cooling rate to predict a final value for outside air temperature.

The algorithm can also be obtained empirically, using experimental data collected in a wind tunnel or on an actual aircraft.

The outside air temperature can thus be derived directly from the information provided at the time the total air temperature sensing element indication reaches level T1 (when the heater is shut off) and its subsequent rate of decay. The rate of decay of the temperature will change as the outside air temperature changes.

The outside air temperature from the temperature signal from TAT probes 24 also can be determined by sampling the temperature at short time intervals, for example, one second or two seconds, and determining the decrease in temperature. If the decrease in temperature, represented by the differential in temperature indicated by the double arrows 50 in FIG. 2 is less than a selected amount for a fixed time period indicated by the double arrow 52, it would be an indication that the temperature signal from sensing element 30 is stabilizing. When the change is very low, as for example near the lower end of plot 42, indicated at 42A, the temperature is at or near outside air temperature. An algorithm can be developed to provide the outside air temperature based on the stabilized indicated temperature.

The algorithm that is depicted graphically in FIG. 2 will allow the outside air temperature to be determined or derived from the total temperature signal from sensing element 30 while the aircraft is on the ground. The outside air temperature derived by the smart probe 20 can then be used by for setting engine controls prior to take off and will eliminate the need for a separate outside air temperature sensor or manual operation.

The heater or heaters 28 can be energized and de-energized in cycles and when the desired target temperature T1 is reached, the probe is allowed to cool by shutting off power to the heater.

A determination is made by the processor as to whether the aircraft is stationary on the ground or is in takeoff or flight mode. The control function to determine outside air temperature described above is used only in the stationary on the ground mode. The aircraft state is monitored continuously to insure that full power is provided to the TAT probe heater when the aircraft begins its takeoff roll or is in flight. To determine aircraft state or mode, factors such as engine speed, weight on the wheels, indicated air speed, and the like are considered.

Figure 3:
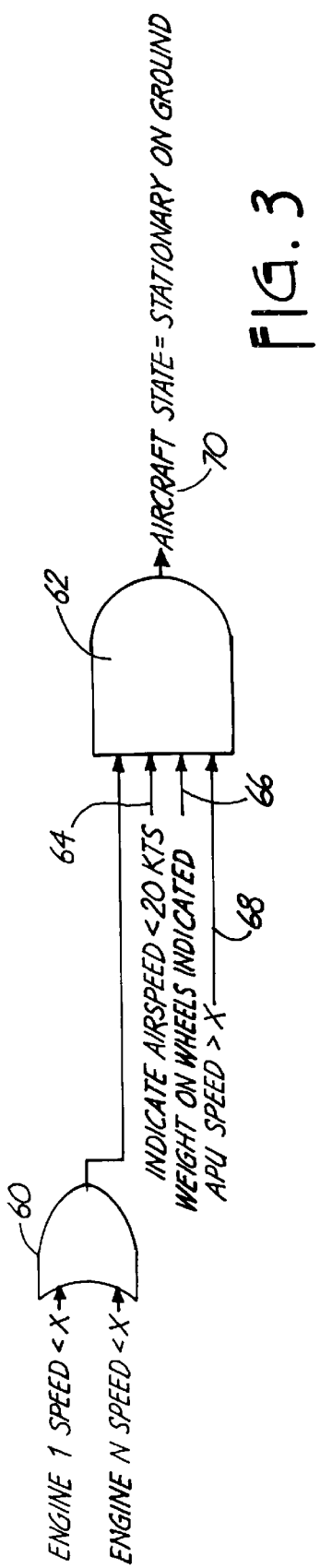
FIG. 3 is a logic diagram for indicating the aircraft mode or state.

An exemplary logic diagram for determining aircraft state is shown in FIG. 3. Engine speed below a certain selected level (x) for one or more engines is indicated by an OR gate 60 and if the engine speed is below the selected level, a positive signal is provided to an input of AND gate 62. Other inputs to AND gate 62, as shown by way of example, are "speed less than 20 knots" at 64, weight on wheels at 66 and APU speed being greater than a selected amount (x) at 68. When all inputs are present, the gate 62 provides a signal that the aircraft state or mode is "stationary on the ground" at 70. If speed is less than 20 knots (a selected value that can be changed based on experience) the aircraft is considered "stationary on the ground".

Figure 4:
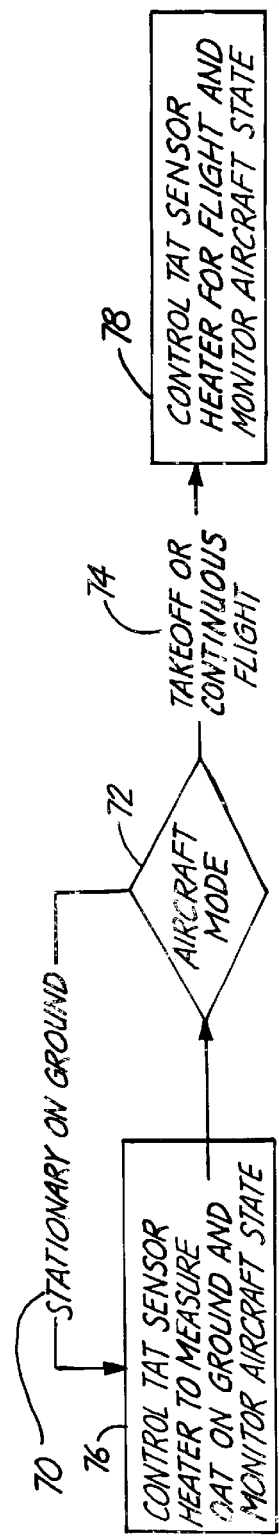
FIG. 4 is a logic diagram illustrating the heater mode selection.

FIG. 4 illustrates the TAT probe heater control selection logic. The aircraft mode 72 is either stationary on the ground mode, as determined in the manner just described or the aircraft is in takeoff or continuous flight mode 74. If stationary on the ground, the TAT probe heater is controlled to measure or determine outside air temperature on the ground by powering the probe heater in cycles. Aircraft state or mode is also monitored as indicated at block 76.

If the aircraft is indicated to be in takeoff or continuous flight mode, the TAT probe heater is controlled for flight, by inhibiting the on the ground functions and normally providing full power to the heater, as shown at block 78. Aircraft state or mode is continuously monitored in flight as well.

Figure 5:
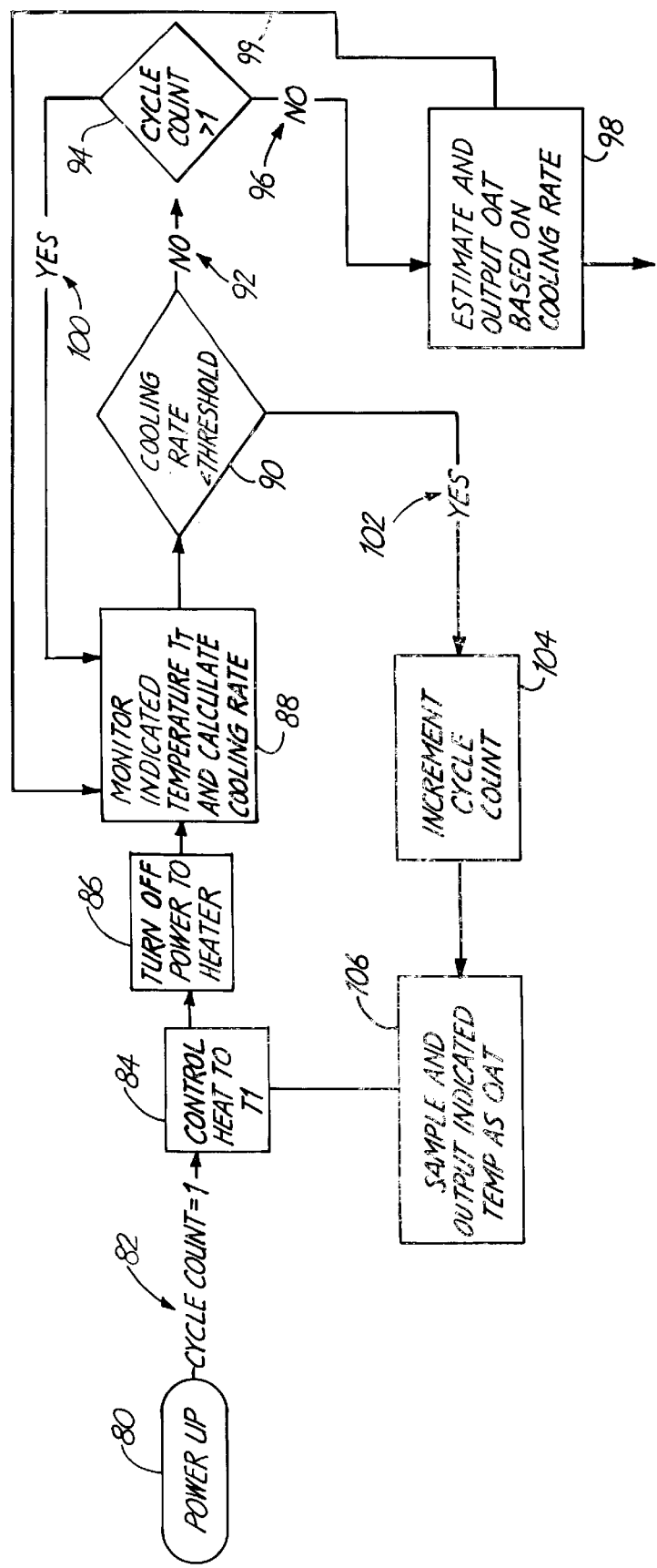
FIG. 5 is a block diagram representing the steps in the process of determining outside air temperature from temperature signals from a heated total temperature sensor.

FIG. 5 is a block diagram that shows the algorithm for controlling the heat provided to the TAT sensor when the aircraft is in the "stationary on ground" state only. Each cycle of the heater in the probe has the general form of FIG. 2 and the heating on/off cycle is repeated continuously until aircraft state is determined to be "takeoff or continuous flight" mode. As shown in FIG. 5, upon aircraft power-up as indicated at block 80, a cycle counter is initialized to 1 as indicated at 82 and the probe heater is turned on and allowed to heat the probe until the temperature indicated by sensing element 30 reaches Ti, as shown by block 84, at which time the heater is turned off, as previously explained and indicated at block 86. The temperature is monitored and a cooling rate is calculated as shown at block 88. The calculations are made at some predetermined sampling rate, such as 100 Hz.

After each sample a determination is made as to whether or not the cooling rate is less than a predetermined threshold, as indicated at block 90, indicating that the temperature is nearing ambient conditions or true outside air temperature.

If the cooling rate is not sufficiently low, that is the cooling rate has not matched the threshold, a "no" signal at 92 initiates a check to determine the current cycle count as indicated at block 94. If the cycle count is not greater than 1, ("no" output at 96) outside air temperature is estimated based on the cooling rate as shown at block 98 and the signal indicating outside air temperature is provided to avionics or other aircraft systems along a line 101. This estimated signal can be provided immediately when enough samples have been made to initialize filters and generate an adequate time differential from power up. The functions of block 88 are continued by a signal along line 99. If the cycle count is greater than one at the cycle count block 94, ("yes" output at 100) the system continues to monitor indicated temperature by returning to the step at block 98.

When the cooling rate is below the threshold indicated by a yes signal on line 102 from block 90, the cycle counter is incremented as at block 104 and the indicated temperature is sampled and made available as the outside air temperature at block 106. At this point a complete cycle has been completed and the heater is turned back on, by a signal on line 105 to the heater control, beginning a new cycle as at block 84.

Figure 6:
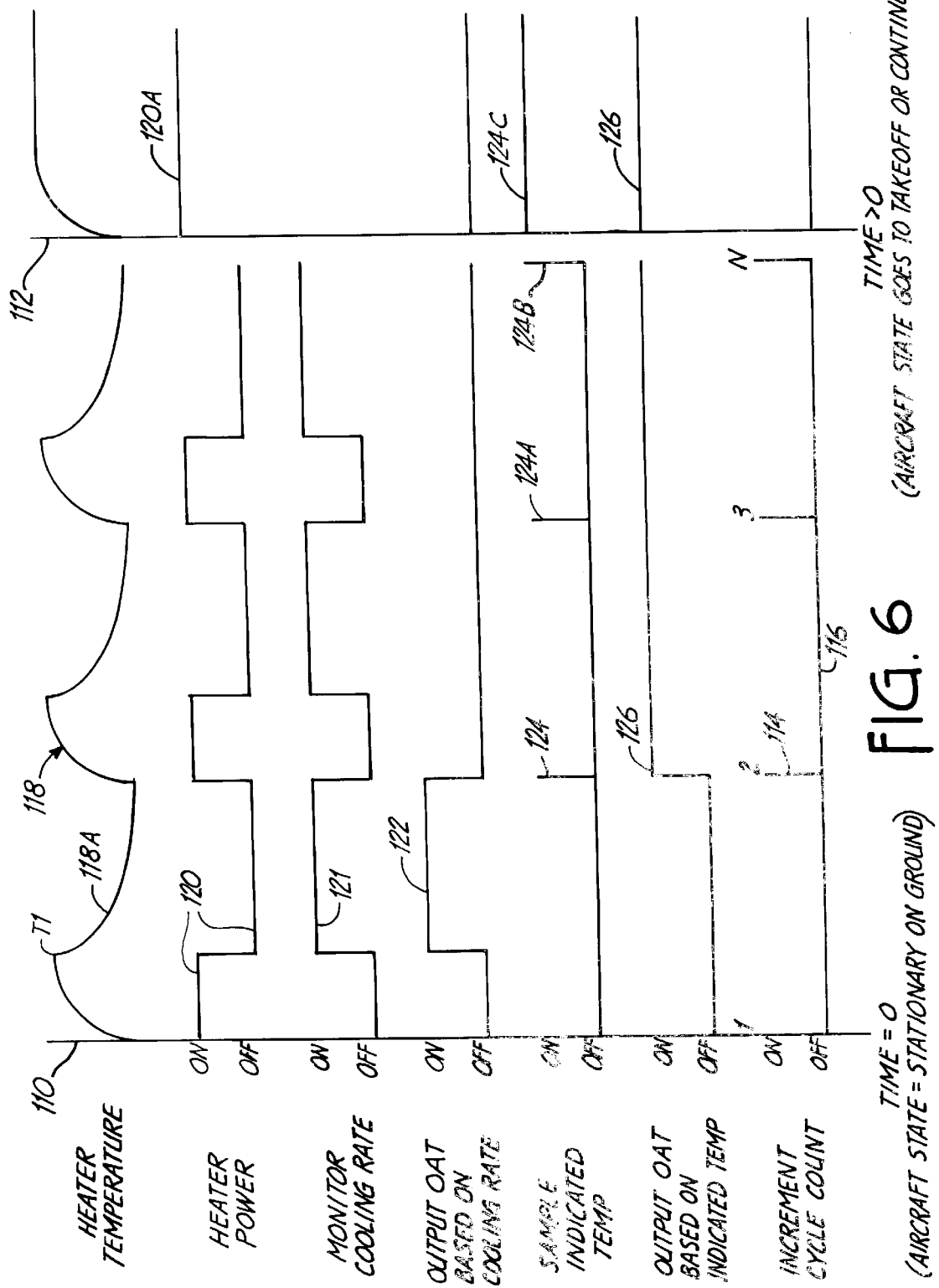
FIG. 6 is a timing diagram of operation using the present invention.

FIG. 6 is a timing diagram that shows the dynamic characteristics of the algorithms beginning at system power-up along vertical line 110. Three complete cycles are shown when the aircraft is stationary on the ground between lines 110 and 112. One cycle after the aircraft state transitions to takeoff or continuous flight mode is shown to the right of line 112. During the first cycle shown adjacent line 110, cooling rate is monitored as indicated by line 121 between start line 110 and count 2 at vertical line 114 along the horizontal increment cycle count plot 116. The heater temperature signal along top plot 118 shows that after Ti is reached and the heater turned off, as indicated by plot 120, the cooling rate shown by line 118A is monitored as indicated by line 121 and a temperature signal based on cooling rate is provided for cycle 1 as indicated on line 122, until the cycle count reaches 2. The outside air temperature signal based on cooling rate is used only until the completion of the first cycle.

At the end of the first cycle and during subsequent cycles, a single temperature reading is taken once as indicated at line 124. At the end of cycle 2 and subsequent cycles, the temperature reading is taken as at 124A and 124B. This sample is then used for the whole of the next cycle, when the cycle count is greater than 1. The outside air temperature output is the sampled or indicated temperature as shown at plot 126. Therefore, cooling rate is used only during the first cycle after the heater is turned off to allow an early indication of outside air temperature.

A single reading is used, when the aircraft is in this mode, when the TAT probe is determined to be equilibrated with the outside air temperature indicated by a near zero cooling rate.

When the aircraft is determined to be in takeoff or continuous flight, which is plotted to the right of vertical line 112 in FIG. 6, heater power is available continuously as shown at 120A. The heater temperature is high and is not monitored. The sampling of indicated temperature is continuous (line 124C) and the outside air temperature output is based on indicated temperature is maintained as shown at 126.

The use of the smart probe processor 20 for processing the total air temperature signals eliminates the need for a separate outside air temperature sensor.

The total air temperature signal may be provided only to the smart probe processor circuitry 20 and not to any separate onboard air data computer. While more than one smart probe can be provided on an aircraft, and the TAT signals sent to each smart probe, no air data computer is needed. However, the cycling of the probe heat and taking measurements at predetermined time, to estimate outside air temperature while the aircraft is on the ground, and the use of the cooling rate for calculating an indication of outside air temperature can be carried out with any aircraft processor, including air data computers separate from a smart probe.

Power is cycled on and off to keep the probe ice free while still allowing temperature measurements when power is removed, and the errors due to heater effects are reduced. It is possible that ice could form on the probe when the heater is being cycled while in the on the ground mode, but any ice that forms would not affect the on-ground temperature measurement or the ability of the heater to remove ice before takeoff.

When the aircraft is determined to be in takeoff mode or in continuous flight, the TAT probe heater is controlled to a constant temperature that is well above the freezing point of water. When in flight, the effects of the heater on temperature measurements are negligible due to airflow over the probe, allowing continuous temperature measurements.

Although the present invention has been described with reference to preferred embodiments, workers skilled in the art will recognize that changes may be made in form and detail without departing from the spirit and scope of the invention.

What is claimed is:

1. A method of determining outside air temperature using temperature signals from a heated total air temperature probe coupled to a processor comprising:

maintaining a probe heater under power with a minimum volume of airflow past the total temperature probe sensor;

setting a maximum temperature to be sensed from the total temperature probe;

shutting off power to the heater when the maximum temperature is sensed; and analyzing changes in temperature indicated by the temperature signals subsequent to shutting off the power for determining outside air temperature.

2. The method of claim 1, wherein the step of analyzing changes in temperature signals comprises determining the rate of change of temperature after shutting off the power.

3. The method of claim 1, wherein the step of analyzing changes in temperature signals comprises determining when the temperature signals from the total air temperature probe show substantial stability, and using stabilized temperature signals for deriving outside air temperature.

4. An apparatus for determining outside air temperature on an aircraft comprising:

a processor on the aircraft having an algorithm for processing temperature signals;

a total air temperature probe for determining total air temperature on the exterior of the aircraft, the total air temperature probe providing a temperature signal to the processor;

a heater for heating said total air temperature probe, said heater being coupled to the processor and controlled thereby;

the processor including a control to shut off the heater when the temperature signal from the total air temperature probe reaches a predetermined threshold; and a circuit controlled by the processor for determining temperature sensed by the total air temperature probe after the power to the heater has been shut off to provide an indication of a rate of cooling of the total air temperature probe for in turn indicating outside air temperature.

5. The apparatus of claim 4 further comprising signal paths from the processor to controls for the aircraft.

6. A control system for an aircraft comprising an air data sensing probe on the aircraft having an integrated processor, the air data sensing probe providing pressure signals to the integrated processor, a total air temperature probe on the aircraft providing a total air temperature signal to the integrated processor of the air data sensing probe for providing inputs to the integrated processor, the integrated processor compensating the pressure signals for controlling functions of the aircraft.

7. The control system of claim 6 including a heater for heating the total air temperature probe and a control in the integrated processor for controlling power to the heater to turn off the heater when a temperature signal from the total air temperature probe reaches a selected level, the integrated processor being the sole control of the heater.

8. The control system of claim 7, wherein the integrated processor provides an indication of rate of cooling when the power to the heater is turned off.

9. The control system of claim 7, wherein the integrated processor samples the irdicated temperature at repeating intervals.

10. The control system of claim 9 further comprising a circuit in the integrated processor for determining when the aircraft is in one of a takeoff mode and a flight mode, and providing continuous power to the heater when the aircraft is one of the modes.

11. The control system of claim 10 wherein the circuit comprises a control logic in the integrated processor for determining the one of the aircraft modes based upon the presence of a plurality of selected parameters involving aircraft operation, comprising speed of an engine of the aircraft, weight on wheels of the aircraft and an indicated air speed of the aircraft.

12. A method of operating a heater of a total temperature probe mounted on an outside of an aircraft, which total temperature probe has a temperature signal output, to maintain the total temperature probe in a deiced condition, comprising:

turning on power to the heater when the aircraft is initially started;

monitoring the total temperature signal output;

determining whether the aircraft is in one of the modes consisting of stationary on the ground mode, a takeoff roll mode and an in flight mode;

determining when the temperature signal reaches a preselected threshold value;

turning off the power to the heater when the total temperature signal output reaches the threshold value; and monitoring total temperature signal output changes for a selected time comprising a first time cycle when power is turned off to determine outside air temperature.

13. The method of claim 12 including monitoring the total temperature signal output during repeating cycles wherein the heater is turned on and off until the aircraft is in one of the modes consisting of takeoff roll mode and in flight mode.

14. The method of claim 12, wherein monitoring the total temperature signal output changes comprises determining the rate of cooling of the total air temperature sensor.

15. The method of claim 13, wherein monitoring the total temperature signal output during repeating cycles comprises determining when the total temperature signal output substantially reaches an equilibrium with the power to the heater turned off to indicate outside air temperature.

16. The method of claim 13 including the step of providing a control signal indicating when the aircraft is in one of the takeoff roll mode and in flight mode, and maintaining the power to the heater when the control signal is received.

17. The method of claim 16 and monitoring the control signal and resuming the determining and monitoring steps when the control signal is no longer provided.

18. The method of claim 12, wherein the step of monitoring total temperature signal ($T_T$) output changes for a selected time to determine outside air temperature comprises solving the equation $$T_T = T(t) = \Delta T_o e^{-(hA/mc)t} + T\infty$$

where:

$T(t)$ is the temperature indicated by the probe at time t is time $\Delta T_o$ is the initial temperature variation between the probe and the outside air ($T_1 - T\infty$)

h is the convection heat transfer coefficient for the probe in outside air $T\infty$ is the outside air temperature A is the surface area of the probe m is the mass of the probe c is the specific heat of the probe.

* * * * *

UNITED STATES PATENT AND TRADEMARK OFFICE
CERTIFICATE OF CORRECTION

PATENT NO.    : 6,370,450 B1
DATED         : April 9, 2002
INVENTOR(S)   : Dana A. Kromer et al.

It is certified that error appears in the above-identified patent and that said Letters Patent is hereby corrected as shown below:

<u>Title page,</u>
Item [57], ABSTRACT,
Line 7, cancel ". Changes".

<u>Column 2,</u>
Line 48, cancel "p" and insert -- P --.

<u>Column 3,</u>
Equation 1 replace with the following:
-- $T_T = T(t) = \Delta T_0 e^{-(hA/mc)t} + T\infty$ --

<u>Column 7,</u>
Line 57, cancel "irdicated" and insert -- indicated --.

<u>Column 8,</u>
Line 51, at the end insert -- "t" --.

Signed and Sealed this

Twenty-sixth Day of November, 2002

Attest:

*Attesting Officer*

JAMES E. ROGAN
*Director of the United States Patent and Trademark Office*